United States Patent [19]
Schwenk et al.

[11] 3,942,815
[45] Mar. 9, 1976

[54] SUSPENSION SYSTEM FOR A STEERABLE VEHICLE AXLE

[75] Inventors: Kurt Schwenk; Albert Grotewohl, both of Wolfsburg, Germany

[73] Assignee: Volkswagenwerk Aktiengesellschaft, Wolfsburg, Germany

[22] Filed: July 1, 1974

[21] Appl. No.: 484,887

[30] Foreign Application Priority Data
July 4, 1973 Germany............................ 2333950

[52] U.S. Cl........................... 280/96.2 R; 180/43 R
[51] Int. Cl.$^2$......................................... B60G 15/00
[58] Field of Search...... 280/96.2 R, 124 A; 267/64; 180/43 R

[56] References Cited
UNITED STATES PATENTS

| | | | |
|---|---|---|---|
| 2,736,570 | 2/1956 | Crane.............................. | 280/96.2 R |
| 2,856,198 | 10/1958 | Muller............................. | 280/96.2 R |
| 2,992,015 | 7/1961 | Halford........................... | 280/96.2 R |
| 3,462,168 | 8/1969 | Gebler............................. | 280/96.2 R |
| 3,490,785 | 1/1970 | Moss............................... | 280/96.2 R |
| 3,573,880 | 4/1971 | Sakai............................... | 280/96.2 R |
| 3,589,701 | 6/1971 | Gee.................................. | 267/64 |
| 3,703,215 | 11/1972 | Takahishi......................... | 180/43 R |

OTHER PUBLICATIONS
Hoyt, et al., S.A.E. Preprint No. 127A Jan., 1960.

Primary Examiner—Philip Goodman
Assistant Examiner—Terrance L. Siemens
Attorney, Agent, or Firm—Brumbaugh, Graves, Donohue & Raymond

[57] ABSTRACT

A motor vehicle suspension system having a substantially vertical spring member articulated to a transverse control arm. The susceptibility of the steering system to wheelfight is reduced by constructing the suspension system in such a way that the following factor, called the "wheelfight factor", approaches zero:

$$k = \frac{\alpha_F + \alpha_L \left\{ 1 - \frac{c_{Ry}/c_{By}}{l/h} \right\}}{1 + \frac{c_{Ry}/c_{By}}{(l/h)^2}}$$

where $\alpha_F$ is the angle between the axis of the spring member and the vertical; $\alpha_L$ is the angle between the axis of the control arm and the horizontal; $l$ is the length of the spring member measured vertically; $h$ is the height of the point of articulation between the spring member and the control arm above the point of wheel contact with the ground; $c_{Ry}$ is the transverse rigidity of the rolling tire at the point of wheel contact with the ground; and $c_{By}$ is the transverse rigidity at the point of articulation between the spring member and the frame of the vehicle.

8 Claims, 2 Drawing Figures

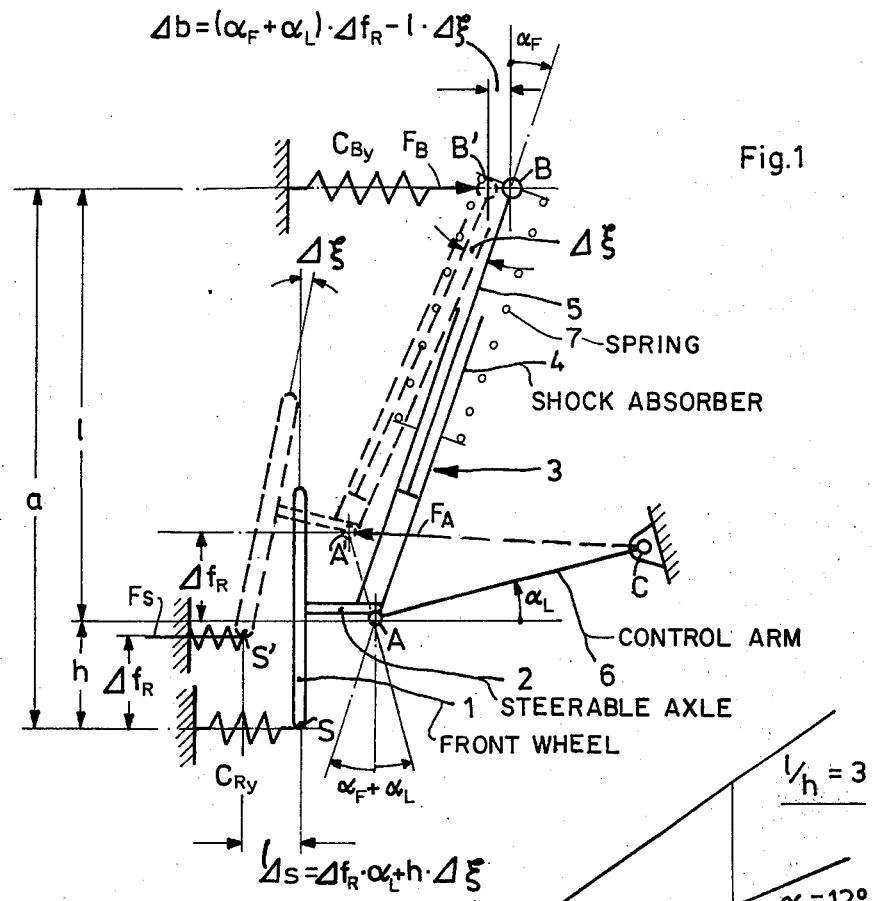
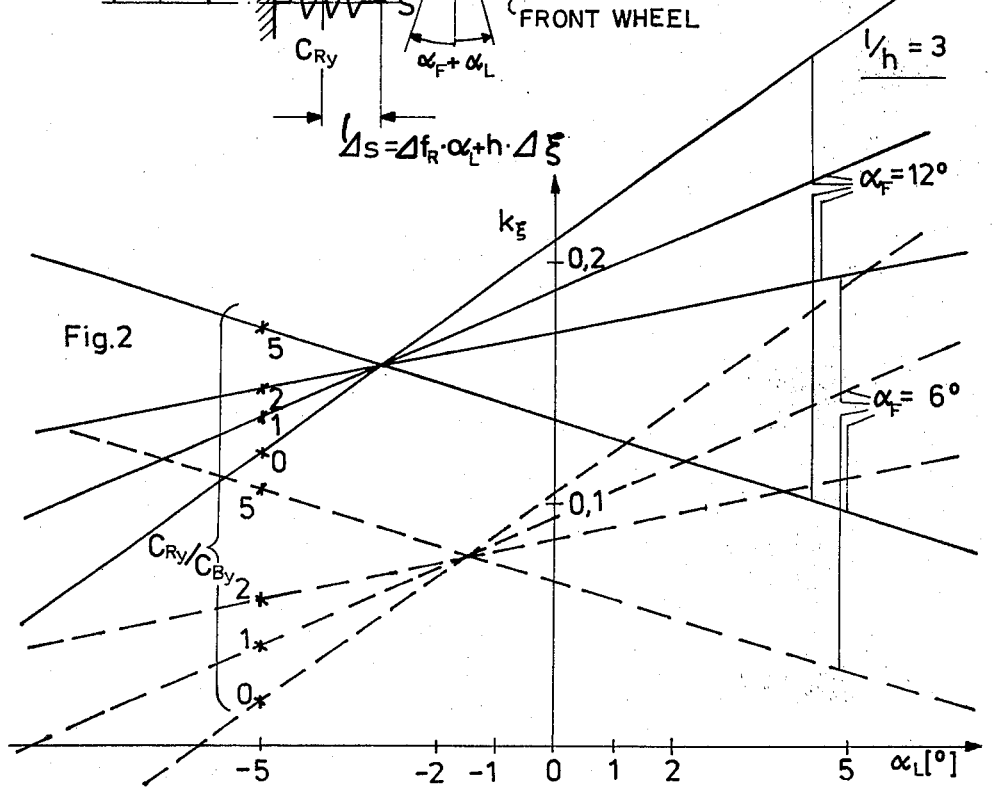

SUSPENSION SYSTEM FOR A STEERABLE VEHICLE AXLE

BACKGROUND OF THE INVENTION

The present invention relates to an automotive suspension system and, more particularly, to a suspension system for a steerable axle having a substantially vertical spring member articulated to a transverse substantially horizontal control arm.

A suspension system of the above-designated type, which is employed in many automotive front end designs, has an advantage over other suspension systems in that the hydraulic shock absorber which is incorporated into the spring member acts as a wheel guide element so that the cost of construction, as well as the structural space requirements, are substantially reduced. A disadvantage of this type of suspension system is that the wheel and axle arrangement sometimes experiences a relatively severe wheelfight, that means a rotary disturbance of the steering wheel, impairing riding comfort very seriously, when several adverse circumstances combine.

It is accordingly an object of the present invention to provide an automotive suspension system of the type above mentioned which is capable of equaling the performance of other conventional axle arrangements, as to wheelfight, without requiring the addition of costly parts or otherwise increasing the cost of manufacture.

SUMMARY OF THE INVENTION

This object, as well as other objects which will become apparent in the discussion that follows, is achieved, according to the present invention, in that the design parameters of the suspension system - namely, the angle $\alpha_F$ between the axis of the spring member and the vertical; the angle $\alpha_L$ between the axis of the control arm and the horizontal; the length $l$ of the spring member measured vertically; the height $h$ of the point of articulation between the spring member and the control arm from the point of wheel contact with the ground; the transverse rigidity $c_{Ry}$ of the rolling tire at the point of wheel contact with the ground; and the transverse rigidity $c_{By}$, determined by the flexural rigidity of the piston rod of the spring member shock absorber, at the point of articulation between the spring member and the frame of the vehicle - are so proportioned that a quantity referred to as the "wheelfight factor"

$$k_\xi = \frac{\alpha_F + \alpha_L \cdot 1 - \left(\frac{c_{Ry}/c_{By}}{l/h}\right)}{1 + \frac{c_{Ry}/c_{By}}{(l/h)^2}}$$

approaches zero.

The invention is based on the discovery that a "wheelfight" in a vehicle steering system, manifesting itself through angular oscillations at the steering wheel with very strong accelerations, is caused principally by vertical radial force fluctuations at the vehicle wheels. The radial force fluctuations, which are in part attributable to unevenness in the tires and to wheel imbalance, cause periodic retractions and extensions of the suspension system spring members, even on a smooth roadway. If these retractions and extensions in the suspension system are accompanied by changes in the camber angle of the wheels, the camber angle variations generate periodic gyroscopic moments at the rotating vehicle wheels, thus acting as a periodic excitation on the oscillatable steering system and giving rise to the above-mentioned angular oscillations at the steering wheel.

It has been found that at certain speeds of a motor vehicle, the vertical radial force fluctuations excite the suspension system of the vehicle, including the vehicle wheels associated therewith, in resonance, resulting in especially large amplitudes of retraction and extension of the suspension system spring members and correspondingly large variations in the camber angles of the wheels. If, in addition, as is the case with some vehicles, the natural frequency of the steering system is more or less of the same order of magnitude as that of the suspension system, a situation of "double resonance" arises, leading to especially severe wheelfight at the steering wheel.

BRIEF DESCRIPTION OF THE DRAWING

FIG. 1 is a schematic diagram of a suspension system for a steerable wheel axle, indicating the parameters which are to be controlled in accordance with the present invention to reduce the susceptibility to wheelfight.

FIG. 2 is a graph showing the dependency of the wheelfight factor $k_\xi$ upon the controlled parameters.

DETAILED DESCRIPTION OF THE INVENTION

The relationships applying to the retractions and extensions of the spring member of a suspension system, the resulting variations in camber angle of the associated wheel, and the accompanying amplitudes of gyroscopic moment will now be set forth with reference to the drawing, so as to explain the design rule according to the present invention.

In the suspension system illustrated in FIG. 1, a front wheel 1 of a motor vehicle is mounted on an axle 2 that is rigidly connected to a shock absorber cylinder 4 of a spring member 3. A piston 5 is slidably guided inside the shock absorber cylinder 4 and provided in a known manner with a hydraulic medium to damp the retractions and extensions of the spring member. A suspension spring, such as a coil spring 7, is connected in parallel with the shock absorber in a manner known in the art. A control arm 6 is connected to the spring member 3 at point A, and to the frame of the vehicle at point C, with suitable pivot joints or bearings. The spring member 3 is similarly articulated to the frame at point B.

The longitudinal axis of the spring member 3 forms an angle $\alpha_F$ with the vertical, measured positively in the clockwise direction, while the control arm 6 forms an angle $\alpha_L$ with the horizontal, measured positively in the counterclockwise direction. At the point S at which the vehicle wheel 1 contacts the ground the transverse rigidity of the wheel (while rolling) may be represented by a spring with a spring constant $c_{Ry}$. Similarly, at the point of articulation B of the spring member 3 there is a transverse rigidity, dependent primarily upon the rigidity of the bearing at point B and the flexural rigidity of the piston rod 5 of the spring member 3, which may be viewed as a spring having a spring constant $c_{By}$. There is also a transverse rigidity at the bearing point A of the spring member 3 and the control arm 6, but the spring constant which may be associated therewith is several times larger than the other two transverse rigidities $c_{Ry}$ and $c_{By}$, and may therefore be disregarded in first approximation.

In FIG. 1 of the drawing, the solid lines represent the neutral condition and the dotted lines the retracted condition (much exaggerated) of the suspension system where the wheel 1, at a spring retraction amplitude $\Delta f_R$, exhibits a camber angle increment $\Delta \xi$.

The periodically fluctuating amplitude of retraction and extension of the wheel, due to radial force fluctuations of the wheel as a result of tire unevenness and imbalance, now excites the transverse oscillatory system consisting of the two transverse springs $c_{Ry}$ and $c_{By}$ and the moment of inertia of the spring member 3 about an axis perpendicular to the transverse plane through point A. On the assumption that the influence of inertia forces in this oscillatory system is fairly negligible compared to the spring forces, inasmuch as the excitation of the spring member transverse oscillatory system is highly subcritical due to its high natural frequencies which are an order of magnitude greater than the natural frequency of oscillation of the steering system, we may derive the following relationships:

By equilibrium of transverse (horizontal) forces $F_A$, $F_B$ and $F_S$ at their respective points A, B and S, we have:

$$F_A = F_B + F_S,$$

and by equilibrium of moments about the point B, we have:

$$F_A = a/l \, F_S,$$

where $a$ is the vertical distance between points B and S and $l$ is the vertical distance between points A and B. The vertical moment exerted by the ground against the wheel may be ignored if a smooth roadway is assumed. Hence the transverse force at the pivot point B is:

$$F_B = c_{By} \cdot \Delta b = c_{By} \cdot (\alpha_F + \alpha_L) \cdot \Delta f_R - c_{By} \cdot l \cdot \Delta \xi$$

and the transverse force $F_S$ at the point of wheel contact is:

$$F_S = c_{Ry} \cdot \Delta s = c_{Ry} \cdot \alpha_L \cdot \Delta f_R + c_{Ry} \cdot h \cdot \Delta \xi,$$

where $\Delta b$ and $\Delta s$ are the horizontal deviations of the points B and S at a given spring retraction amplitude $\Delta f_R$ and are determined from the geometry of the suspension system assuming small angles $\alpha$ so that $\sin \alpha \approx \alpha$ and $\cos \alpha \approx 1$. From these four equations it is possible to determine the unknowns $F_A$, $F_B$, $F_S$ and $\Delta \xi$. If it is noted that $\Delta \xi$ is directly responsible for the gyroscopic moment $M_{Kr}$ on the wheel — that is, $M_{Kr} = \theta_R \cdot \omega R \cdot \Delta \xi$, where $\theta_R$ is the moment of inertia of the wheel about its axis of rotation and $\omega_R$ is its angular velocity — we find the required relationship between the amplitude $\Delta f_R$ of retraction and extension and the camber angle amplitude $\Delta \xi$ to be $\Delta \xi / \Delta f_R = k \xi / l$ or $\Delta \xi = k$ or $\Delta f_R / l$, where:

$$k_\xi = \frac{\alpha_F + \alpha_L \left(1 - \frac{c_{Ry}/c_{By}}{l/h}\right)}{1 + \frac{c_{Ry}/c_{By}}{(l/h)^2}}$$

For constant amplitude $\Delta f_R$ of retraction and extension, the gyroscopic moment and hence the wheelfight of the steering system depend essentially on this quantity: the so-called "wheelfight factor" $k_\xi$. Since the quantity $k$ depends upon design parameters only, it directly represents their influence on the amount of wheelfight. Thus, in order to minimize the wheelfight or, if possible, to eliminate it entirely, the design parameters which, according to the above formula, determine the wheelfight factor $k_\xi$ must be chosen so that this quantity (and, thus, $\Delta \xi$ which is related to the gyroscopic moment) approaches zero.

In FIG. 2 of the drawing, the magnitude of the wheelfight factor $k_\xi$ is plotted against the control arm angle $\alpha_L$ for a fixed ratio $l/h = 3$ and for various values of the spring member angle $\Delta_F$ and of the ratio $c_{Ry}/c_{By}$. The ratio $c_{Ry}/c_{By}$ of the transverse spring rigidities is varied between zero and 5, and the spring member angle $\alpha_F$ is taken to be 12° in one instance and 6° in another.

Upon consideration of the behavior of the wheelfight factor $k_\xi$ in FIG. 2, it may be seen that a reduction in the spring member angle $\alpha_F$ operates to reduce the wheelfight factor in every case. A change in the control arm angle $\alpha_L$, on the other hand, results in either a decrease or an increase of the wheelfight factor, depending upon the particular transverse spring rigidity ratio $c_{Ry}/c_{By}$. Thus it turns out that with small spring rigidity ratios - in particular, ratios of $c_{Ry}/c_{By}$ which are less than the ratio $l/h$ - a reduction of the control arm angle $\alpha_L$ (measured from the horizontal in the counter-clockwise direction, as indicated in FIG. 1) likewise reduces the wheelfight factor $k_\xi$ while for spring rigidity ratios $c_{Ry}/c_{By}$ greater than $l/h$ a reduction of the control arm angle $\alpha_L$ leads to an increase in the wheelfight factor.

From FIG. 2 it may also be seen that for a ratio $l/h$ equal to 3, and a spring member angle $\alpha_F = 6°$, the desired zero-value for the wheelfight factor $k_\xi$ is attained, for a transverse spring rigidity ratio $c_{Ry}/c_{By} = 0$, at a control arm angle $\alpha_L$ of - 6°; for a spring rigidity ratio of 1 at about $\alpha_L = -9°$; and for a spring rigidity ratio of 5 at $\alpha_L = +9°$.

The formula given for the wheelfight factor shows further that, independently of the other design parameters, a wheelfight factor $k_\xi$ of zero is obtained if the spring member angle $\alpha_F$ and the control arm angle $\alpha_L$ are both zero; that is, if the spring member is arranged vertically on a horizontally oriented control arm. The wheelfight factor $k_\xi$ will likewise vanish if the spring member angle $\alpha_F = 0$ and the spring rigidity ratio $c_{Ry}/c_{By}$ is equal to the ratio $l/h$ of the lengths.

However, the wheelfight factor $k_\xi$ need not necessarily be reduced to zero. It may be shown that wheelfight will be hardly perceptible if this factor is made sufficiently small; i.e., preferably under 0.075.

Finally, it remains to be explained how, for a given suspension system, it is possible to determine the transverse spring rigidities at the points B and S. The transverse rigidity $c_{By}$ at the point B, as determined essentially by the flexural rigidity of the piston rod of the shock absorber, may be calculated according to the formula:

$$c_{By} = \frac{\frac{h}{l} \frac{(\delta F_S)}{(\delta \Delta \xi)} \Delta \xi = 0 \cdot \frac{(\delta F_S)}{(\delta \Delta y_A)} \Delta y_A = 0}{l \frac{(\delta F_S)}{(\delta \Delta y_A)} \Delta y_A = 0 - \frac{(\delta F_S)}{(\delta \Delta \xi)} \Delta \xi = 0}$$

which is derived from the statics of an elastically suspended flexurally rigid beam and in which $F_S$ is the lateral force at the point of wheel contact; $\Delta\xi$ is the change in the camber angle; and $\Delta y_A$ is the transverse displacement at the pivot point A of the spring member. The quantities $(\delta F_S/\delta\Delta\xi)\Delta\xi=$ and $(\delta F_S/\delta\Delta y_A)\Delta y_A=$ which are used in this formula may be determined experimentally by taking measurements of the transverse displacement $\Delta y_A$ and of the camber angle change $\Delta\xi$ as a function of the varying lateral force $F_S$ on an actual spring member. From the measurements there are obtainable graphs of the lateral force $F_S$ plotted against the transverse displacement $\Delta y_A$ and the camber angle $\Delta\xi$, respectively. The inclinations of the tangent lines to the graphs in the points $\Delta y_A = 0$ and $\Delta\epsilon = 0$, respectively, then give the quantities $$\frac{\delta F_S}{\delta\Delta y_A} \quad \Delta y_A = 0$$

and $$\frac{\delta F_S}{\delta\Delta\xi} \quad \Delta\xi = 0.$$

On the other hand, the dynamic transverse rigidity $c_{Ry}$ of the rolling tire at the point of contact with the ground may be given as the partial derivative of the lateral force $F_S$ with respect to the transverse displacement $y$ of the rolling tire in the point of contact with the ground $c_{Ry} = \delta F_S/\delta y$ which can be transformed to $$c_{Ry} = \frac{\frac{\delta F_S}{\delta\alpha_{Fl}}}{\frac{\delta y}{\delta\alpha_{Fl}}}.$$

Therein the partial derivative of the lateral force $F_S$ with respect to the float angle $\alpha_{Fl}$ of the tire is the lateral force gradient or the floating rigidity $c\alpha_{Fl} = \delta F_S/\delta\alpha_{Fl}$ of the tire and the partial derivative of the transverse displacement $y$ with respect to the float angle $\alpha_{Fl}$ of the tire is the transverse displacement gradient or the tire caster $c_\tau = \delta y/\delta\alpha_{Fl}$. These quantities $\delta\delta F_S/\delta\alpha_{Fl}$ and $\delta y/\delta\alpha_{Fl}$ are obtainable from the familiar GOUGH diagrams of the respective tire showing the curves of the lateral force $F_S$ over the restoring moment M of the tire with the float angle $\alpha_{Fl}$, the wheel load $L$, the velocity $v$ and the tire pressure $p$ as variable parameters. For that purpose associated values of the lateral force $F_S$, of the float angle $\alpha_{Fl}$ and of the tire caster $c_\tau = \delta y/\delta\alpha_{Fl}$ which is the quotient of the tire restoring moment M by the lateral force $F_S$ $c = \delta y/\delta\alpha_{Fl} = M/F_S$ are readable from the Gough diagrams for constant middle values of the wheel load $L$, of the velocity $v$ and of the tire pressure $p$. Then graphs of the lateral force $F_S$, of the lateral force gradient $\delta F_S/\delta\alpha_{Fl}$ and of the tire caster $c_\tau = \delta y/\delta\alpha_{Fl}$ are plotted against the float angle $\alpha_{Fl}$ and the quantities $\delta F_S/\delta\alpha_{Fl}$ calculate the dynamic transverse rigidity $c_{Ry}$ according the mentioned formula $$c_{Ry} = \frac{\frac{\delta F_S}{\delta\alpha_{Fl}}}{\frac{\delta y}{\delta\alpha_{Fl}}}.$$

The design rule specified by the present invention according to which the wheelfight factor $k_\xi$, insofar as possible, is maintained at a value of zero, or in any case below 0.075, thus provides an effective measure for a reduction or even a complete elimination of wheelfight in the steering system of a vehicle with a suspension system of the above-described type. As mentioned above, this type of suspension system is advantageous in terms of its structural space requirements and its cost of construction.

It will be understood that the automotive suspension system according to the present invention is susceptible to various modifications, changes and adaptations as will occur to those skilled in the art. It is therefore intended that the scope of the present invention be limited only by the following claims and their equivalents.

We claim:

1. A suspension system for a steerable axle of a motor vehicle comprising, in combination:
  a. an axle;
  b. a vehicle wheel mounted on said axle;
  c. a spring member extending approximately vertically between said axle and the frame of the vehicle, said spring member having a longitudinal axis forming an angle $\alpha_F$ with respect to the vertical, and said spring member including a shock absorber having a piston arranged within a cylinder and a piston rod extending between said piston and one end of said shock absorber; and
  d. a control arm extending approximately horizontally between said spring member and the frame of the vehicle, the point of articulation between the control arm and the spring member being a vertical distance $h$ above the point of wheel contact with the ground and a vertical distance $l$ below the point of articulation between the spring member and the vehicle frame, said control arm having a longitudinal axis forming an angle $\alpha_L$ with respect to the horizontal;
  the transverse rigidity of the vehicle wheel at the point of contact with the ground being $c_{Ry}$, and the transverse rigidity at the point of articulation between the spring member and the vehicle frame, as determined essentially by the flexural rigidity of the piston rod, being $c_{By}$;
  wherein the parameters $\alpha_F$, $\alpha_L$, $h$, $l$, $c_{Ry}$ and $c_{By}$ are so chosen that the following factor, called the "wheelfight factor", is approximately zero:

$$k = \frac{\alpha_F + \alpha_L \left(1 - \frac{c_{Ry}/c_{By}}{(l/h)}\right)}{1 + \frac{c_{Ry}/c_{By}}{(l/h)^2}},$$

whereby, in operation, the steering system will not be susceptible to wheelfight.

2. The suspension system defined in claim 1, wherein the wheelfight factor $k_\xi$ is less than 0.075.

3. The suspension system defined in claim 1, wherein the angle $\alpha_F$ between the axis of the spring member and the vertical and also the angle $\alpha_L$ between the axis of the control arm and the horizontal are zero.

4. The suspension system defined in claim 1, wherein the angle $\alpha_F$ between the axis of the spring member and the vertical is zero, and wherein the ratio of the transverse rigidities at the point of wheel contact with the ground and the point of articulation between the spring member and the vehicle frame is equal to the ratio of the length $l$ of the spring member to the vertical distance $h$ between the point of wheel contact with the ground and the point of articulation between the control arm and the spring member ($c_{Ry}/c_{By} = l/h$).

5. A process for dimensioning a vehicle suspension system of the type comprising:
   a. an axle;
   b. a vehicle wheel mounted on said axle;
   c. a spring member extending approximately vertically between said axle and the frame of the vehicle, said spring member having a longitudinal axis forming an angle $\alpha_F$ with respect to the vertical, and said spring member including a shock absorber having a piston arranged within a cylinder and a piston rod extending between said piston and one end of said shock absorber; and
   d. a control arm extending approximately horizontally between said spring member and the frame of the vehicle, the point of articulation between the control arm and the spring member being a vertical distance $h$ above the point of wheel contact with the ground and a vertical distance $l$ below the point of articulation between the spring member and the vehicle frame, said control arm having a longitudinal axis forming an angle $\alpha_L$ with respect to the horizontal;

said process comprising the steps of:

1. determining the transverse rigidity $C_{Ry}$ of the vehicle wheel at the point of contact with the ground;
2. determining the transverse rigidity $c_{By}$ at the point of articulation between the spring member and the vehicle frame; and
3. selecting the parameters $\alpha_F$, $\alpha_L$, $l$, and $h$ of the suspension system so that the following factor, called the "wheelfight factor", is approximately zero:

$$k_\xi = \frac{\alpha_F + \alpha_L \left(1 - \frac{c_{Ry}/c_{By}}{l/h}\right)}{1 + \frac{c_{Ry}/c_{By}}{(l/h)^2}}$$

whereby, in operation, the steering system will not be susceptible to wheelfight.

6. The process defined in claim 5, wherein the parameters $\alpha_F$, $\alpha_L$, $l$ and $h$ are selected such that $k_\xi$ is less than 0.075.

7. The process defined in claim 5, wherein the angle $\alpha_F$ between the axis of the spring member and the vertical and also the angle $\alpha_L$ between the axis of the control arm and the horizontal are selected to equal zero.

8. The process defined in claim 5, wherein the angle $\alpha_F$ between the axis of the spring member and the vertical is selected to equal zero, and wherein the length $l$ of the spring member and the distance $h$ between the point of wheel contact with the ground and the point of articulation between the control arm and the spring member are so selected that their ratio ($l/h$) is equal to the ratio of the transverse rigidities at the point of wheel contact with the ground and the point of articulation between the spring member and the vehicle frame ($l/h = c_{Ry}/c_{By}$).

* * * * *

UNITED STATES PATENT AND TRADEMARK OFFICE
CERTIFICATE OF CORRECTION

PATENT NO. : 3,942,815
DATED : March 9, 1976
INVENTOR(S) : Kurt Schwenk and Albert Grotewohl It is certified that error appears in the above-identified patent and that said Letters Patent are hereby corrected as shown below:

First page, line 8 of the Abstract, "k =" should read --$k_\xi$--;
Col. 3, line 55, "wR" should read --$w_R$--;
Col. 3, line 59, "k or." should read --$k_\xi$ .--;
Col. 4, line 3, "k " should read --$k_\xi$--;
Col. 4, line 14, "$\Delta_F$" should read --$\alpha_F$--;
Col. 5, line 6, after " = " (both occurrences) insert --O--;
Col. 5, lines 18-24, " $\frac{\delta F_S}{\delta \Delta y_A} \Delta y_A = 0$  and  $\frac{\delta F_S}{\delta \Delta \xi} \Delta \xi = 0$ "

should read -- $\left(\frac{\delta F_S}{\delta \Delta y_A}\right) \Delta y_A = 0$  and  $\left(\frac{\delta F_S}{\delta \Delta \xi}\right) \Delta \xi = 0$ --;

Col. 5, line 45, "$\delta \delta F_S$" should read --$\delta F_S$--;
Col. 5, line 53, after "c" insert --$\tau$--;
Col. 5, line 59, before "calculate" insert -- and $\frac{\delta y}{\delta \alpha_{F1}}$ at the points $\alpha_{F1} = 0$ are taken in order to --;
Col. 6, line 54 "k" should read --$k_\xi$--.

Signed and Sealed this

*twenty-ninth* Day of *June 1976*

[SEAL]

Attest:

RUTH C. MASON
*Attesting Officer*

C. MARSHALL DANN
*Commissioner of Patents and Trademarks*